(12) United States Patent
Persaud

(10) Patent No.: US 12,514,477 B2
(45) Date of Patent: Jan. 6, 2026

(54) SYSTEMS AND METHODS FOR AUTOMATED MONITORING OF HUMAN BEHAVIOR

(71) Applicant: Eknauth Persaud, Arlington, TX (US)

(72) Inventor: Eknauth Persaud, Arlington, TX (US)

( * ) Notice: Subject to any disclaimer, the term of this patent is extended or adjusted under 35 U.S.C. 154(b) by 867 days.

(21) Appl. No.: 17/568,701

(22) Filed: Jan. 4, 2022

(65) Prior Publication Data

US 2022/0125359 A1     Apr. 28, 2022

Related U.S. Application Data

(63) Continuation-in-part of application No. 16/700,293, filed on Dec. 2, 2019, now Pat. No. 11,213,015.

(51) Int. Cl.
*A61B 5/16* (2006.01)
*A61B 5/00* (2006.01)
(Continued)

(52) U.S. Cl.
CPC .......... *A61B 5/165* (2013.01); *A61B 5/0077* (2013.01); *A61B 5/1113* (2013.01); *G06T 7/246* (2017.01); *G06T 7/73* (2017.01); *G06V 20/41* (2022.01); *G06V 20/44* (2022.01); *G06V 20/46* (2022.01); *G06V 40/193* (2022.01); *G06V 40/20* (2022.01); *G16H 40/63* (2018.01); *A61B 2562/0257* (2013.01); *G06T 2207/10016* (2013.01); *G06T 2207/30201* (2013.01)

(58) Field of Classification Search
CPC ..... A61B 5/165; A61B 5/0077; A61B 5/1113; A61B 2562/0257; A61B 5/1128; A61B 5/163; G06T 7/246; G06T 7/73; G06T 2207/10016; G06T 2207/30201; G06T 2207/20084; G06T 2207/20072; G06T 2207/20076; G06T 2207/20081; G06T 2207/30196; G06T 2207/30232; G06V 20/41; G06V 20/44; G06V 20/46; G06V 40/193; G06V 40/20; G06V 20/52; G06V 40/161; G06V 40/25; G16H 40/63
See application file for complete search history.

(56) References Cited

U.S. PATENT DOCUMENTS

2003/0058111 A1\* 3/2003 Lee ................... G08B 13/19641
                                                                   348/E7.086
2005/0232461 A1\* 10/2005 Hammoud ............. G06V 40/19
                                                                   382/103

(Continued)

*Primary Examiner* — Tom Y Lu
(74) *Attorney, Agent, or Firm* — Thrasher Associates

(57) ABSTRACT

A system and method for automating a recorded observed behavior of at least one person is disclosed. The present invention records a video of the at least one person with respect to at least one object and detects at least one feature of the at least one person and the at least one object from at least one video image. Further, the present invention measures one or more parameters, wherein the one or more parameters correspond to a proximity between the at least one feature of the at least one person and the at least one object, eye coordinates, head coordinates. Based on which, the present invention automatically determines and notifies behavior characteristics of the at least one person by detecting at least one of the proximity meets a predefined threshold criteria, the eye coordinates and the head coordinates meet a pre-defined threshold coordinates.

11 Claims, 5 Drawing Sheets

(51) Int. Cl.
*A61B 5/11* (2006.01)
*G06T 7/246* (2017.01)
*G06T 7/73* (2017.01)
*G06V 20/40* (2022.01)
*G06V 40/18* (2022.01)
*G06V 40/20* (2022.01)
*G16H 40/63* (2018.01)

(56) References Cited

U.S. PATENT DOCUMENTS

2009/0232357 A1* 9/2009 Angell ............... G06V 20/52
    382/103
2020/0211343 A1* 7/2020 Mullins ............... H04R 27/00

* cited by examiner

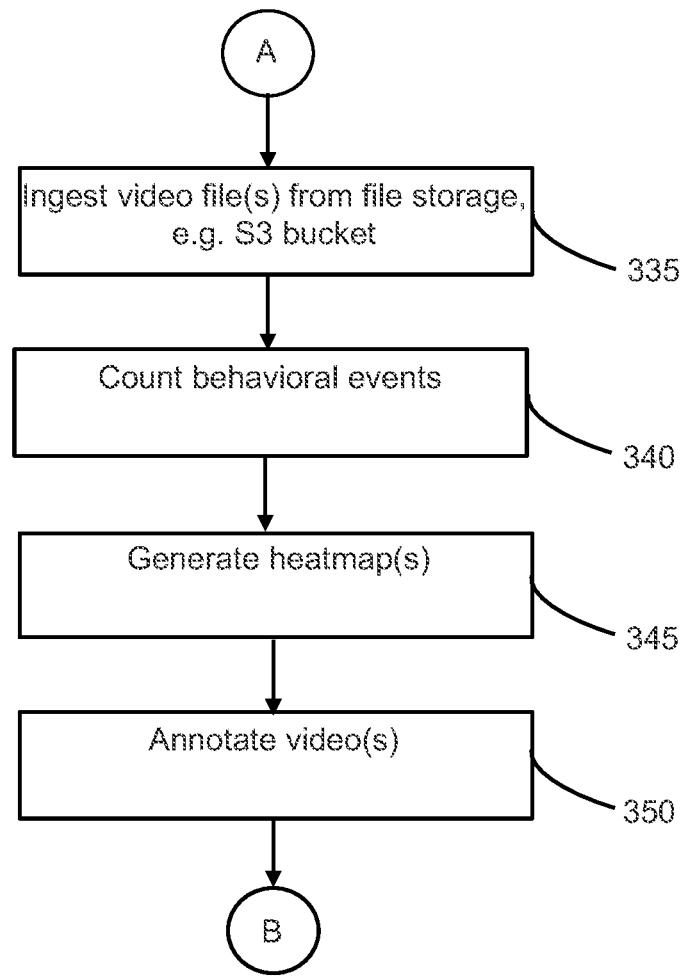
FIGURE 3 (Cont...)

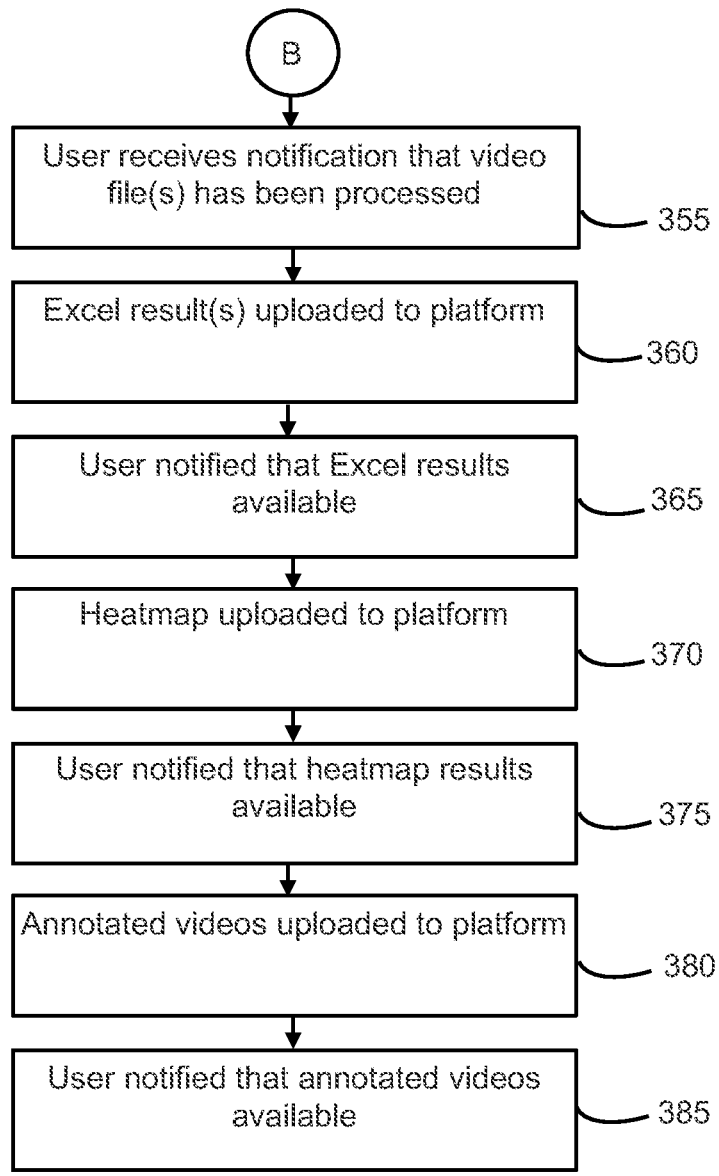
FIGURE 3 (Cont...)

SYSTEMS AND METHODS FOR AUTOMATED MONITORING OF HUMAN BEHAVIOR

CLAIM OF PRIORITY TO RELATED APPLICATIONS

This Non-Provisional patent application is a Continuation-in-Part of, is related to, and claims priority from co-pending U.S. patent application Ser. No. 16/700,293 filed on Dec. 2, 2019 entitled "SYSTEM AND A METHOD OF LAB ANIMAL OBSERVATION" to common inventor Eknauth Persaud which is incorporated herein by reference, and which claims priority to U.S. Provisional Patent Application No. 62/901,263, filed Sep. 17, 2019, by Eknauth Persaud, entitled "LAB MOUSE OBSERVATION SYSTEM AND METHOD."

TECHNICAL FIELD

The present disclosure generally relates to detection of human behavior, and more specifically, to systems and methods for monitoring human behavior in a defined space.

Problem Statement and History

Interpretation Considerations

This section describes technical field in detail and discusses problems encountered in the technical field. Therefore, statements in the section are not to be construed as prior art.

Discussion of History of the Problem

Human behavior detection has become prevalent and is a research-oriented field that helps identify a person's normal and/or abnormal behavior towards a product or another person or an environment. For example, if a person shows behavior which indicate that he may steal an object, then measures can be taken to less the likelihood that he will follow through on the indicated intent. Early detection of such abnormal behavior can help mitigate threats and risks or any harmful event(s).

One common approach is to use surveillance systems to physically monitor and observe behavior and movement of a person by trained personnel. However, this process is accomplished under substantial human observations, i.e., requires human intervention, which is expensive and subject to misinterpretation, confusion, and other errors. Further, in today's litigious society, if an observer chooses to identify someone as a potential shoplifter and intervenes in public, then the target (who may have even been shoplifting, or 'casing' to do so) may claim civil rights violations and sue the shop owner(s). Further, in large gatherings, surveillance systems using human observation have difficulty differentiating between normal behavior/movement and abnormal behavior/movement on an individual basis.

Thus, there exists a need to address the aforesaid limitations and with a system and method to effectively automate the monitoring of human behavior. Accordingly, the present invention provides such a solution.

SUMMARY

The present invention discloses an artificial intelligence based platform that enables the automated detection of human behavior. The present invention obtains at least one video image comprising at least one person and at least one object and detects at least one feature of the at least one person and the at least one object using a knowledge graph. Post detection, the present invention measures one or more parameters such as a proximity between the at least one feature of the at least one person and the at least one object, eye coordinates, and head coordinates, for example and automatically determines behavior characteristics of the at least one person by detecting at least one of the proximity meets a predefined threshold criteria, the eye coordinates and the head coordinates meet a pre-defined threshold coordinates. The behavior characteristics comprise at least one of a type of behavioral events of the at least one person, a time interval corresponding to each type of behavioral events, number of occurrences of each type of behavioral events, latency associated with each type of behavioral events, a distance traveled by the at least one person. Lastly, the present invention provides a notification message indicating the behavior characteristics of the at least one person.

The proximity between the at least one feature of the at least one person and the at least one object is measured by determining center-of-mass of the at least one feature associated with the at least one person in the at least one video image and tracking movements of the at least one feature in relation with the at least one object using the center-of-mass of the at least one feature.

At least one of the eye coordinates and head coordinates is measured by determining coordinates of at least one eye and the head derived from the current position an eye and the head associated with the at least one person in at least one video image. Then measurement continues by tracking movements of the eye and the head in relation with the at least one object using the current position of the eye and head.

Of course, the present is simply a summary, and not a complete description of the invention and is not limiting. The invention itself is defined by and limited only by the Claims.

BRIEF DESCRIPTION OF THE DRAWINGS

Various aspects of the invention and its embodiment are better understood by referring to the following detailed description. To understand the invention, the detailed description should be read in conjunction with the drawings.

DESCRIPTION OF AN EXEMPLARY PREFERRED EMBODIMENT

Interpretation Considerations

While reading this section (Description of An Exemplary Preferred Embodiment, which describes the exemplary embodiment of the best mode of the invention, hereinafter referred to as "exemplary embodiment"), one should consider the exemplary embodiment as the best mode for practicing the invention during filing of the patent in accordance with the inventor's belief. As a person with ordinary skills in the art may recognize substantially equivalent structures or substantially equivalent acts to achieve the same results in the same manner, or in a dissimilar manner, the exemplary embodiment should not be interpreted as limiting the invention to one embodiment.

The discussion of a species (or a specific item) invokes the genus (the class of items) to which the species belongs as well as related species in this genus. Similarly, the recitation of a genus invokes the species known in the art. Furthermore, as technology develops, numerous additional alternatives to achieve an aspect of the invention may arise. Such advances are incorporated within their respective genus and should be recognized as being functionally equivalent or structurally equivalent to the aspect shown or described.

A function or an act should be interpreted as incorporating all modes of performing the function or act, unless otherwise explicitly stated. For instance, sheet drying may be performed through dry or wet heat application, or by using microwaves. Therefore, the use of the word "paper drying" invokes "dry heating" or "wet heating" and all other modes of this word and similar words such as "pressure heating".

Unless explicitly stated otherwise, conjunctive words (such as "or", "and", "including", or "comprising") should be interpreted in the inclusive and not the exclusive sense.

As will be understood by those of the ordinary skill in the art, various structures and devices are depicted in the block diagram to not obscure the invention. In the following discussion, acts with similar names are performed in similar manners, unless otherwise stated.

The foregoing discussions and definitions are provided for clarification purposes and are not limiting. Words and phrases are to be accorded their ordinary, plain meaning, unless indicated otherwise.

Description of the Drawings, a Preferred Embodiment

Figure 1:
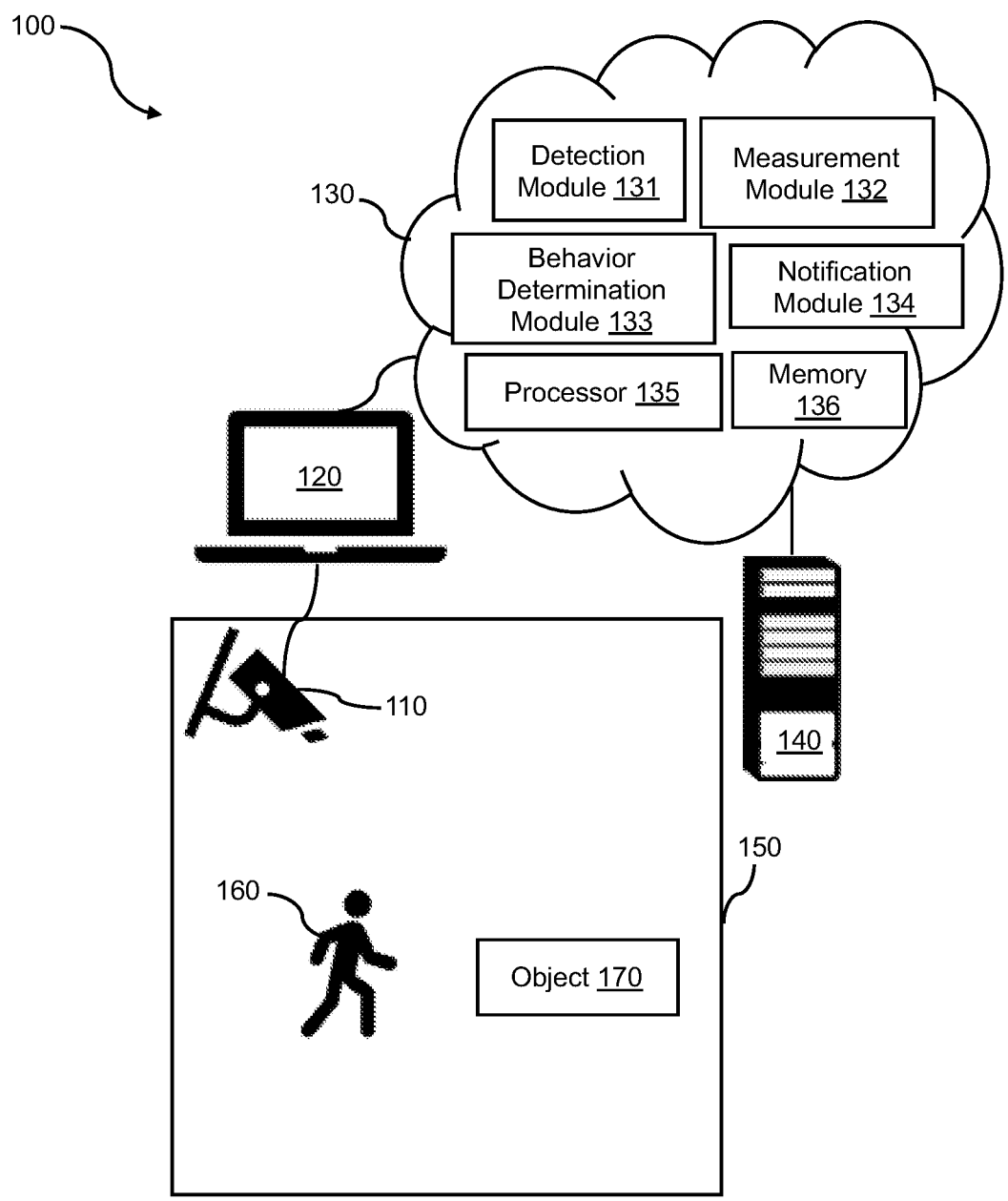
FIG. 1 is a system-level diagram of a human behavior monitoring system.

FIG. 1 is a system-level diagram of a human behavior monitoring system 100 which automatically determines behavior characteristics of at least one person 160. The human behavior monitoring system 100 comprises a recording unit 110, a user equipment 120, a preferably networked platform 130, a server 140 (which may by a cloud server) and a defined space (interchangeably "confined space") 150.

The recording unit 110 is preferably, but not limited to, a video camera. The recording unit 110 may be mounted on a wall or on a tripod or on any other suitable surface from where it can observe the at least one person 160 constrained in the defined space 150. Although the recording unit 110 is shown installed within the defined space 150, the recording unit 110 may be installed at any other location from where it can monitor movement, gesture, behavior, eyeball orientation, detect the exploration of objects, and the like. The defined space 150 comprises at least one object 170. The defined space 150 may be any room, gallery, hall, shop, passage for example.

The recording unit 110 captures at least one static image or at least one video image of the at least one person 160 and transmits the image to the platform 130 via the user equipment 120 to automatically determine the behavior characteristics of the person 160. For example, the recording unit 110 captures at least one image of the person 160 during exit and entry through the defined space 150 and/or while touching or picking up the object 170. In an additional embodiment, a plurality of images define a video, and the video is transmitted to the platform 130 via the user equipment 120. The recording unit 110 may be connected with the user equipment 120 via a communication means including a wired communication means or a wireless communication means such as, Bluetooth, near field communication, WI-FI, cellular network(s), or universal serial bus, for example. Further, the recording unit 110 transfers the at least one video image of the at least one person 160 to the platform 130 via the user equipment 120 in real-time or in near real-time or in recorded form. The user equipment 120 may be a laptop, a smartphone, a pager, a tablet computer, a desktop, or a pad device such as an iPad, for example.

The platform 130 is preferably an artificial intelligence (AI) platform which is created from a machine learning method called deep learning. The machine learning enables the platform to automatically learn and improve from experience without being explicitly programmed.

One deep learning method uses a neural network capable of learning in an unsupervised manner from data that is unstructured or unlabeled. Deep learning is a method of machine learning that employs multiple layers of neural networks that enable the platform of the present invention to teach itself through inference and pattern recognition, rather than development of procedural code or explicitly coded software algorithms (however, machine learning is augmented and enhanced with software algorithms). The neural networks are modeled according to the neuronal structure of a mammal's cerebral cortex, where neurons are represented as nodes and synapses are represented as uniquely weighted paths or "tolled roads" between the nodes. The nodes are then organized into layers to comprise a network. Additionally, the neural networks are organized in a layered fashion that includes an input layer, intermediate or hidden layers, and an output layer.

The neural networks enhance their learning capability by varying the uniquely weighted paths based on received input. The successive layers within the neural network incorporate a learning capability by modifying their weighted coefficients based on their received input patterns. From this foundation, one can see that the training of the neural networks is very similar to how we teach children to recognize an object. The neural network is repetitively trained from a base data set, where results from the output layer (or, simply "output") are successively compared to the correct classification of the image. Similarly, in the present invention, a training data set is developed from labeled images of human eyes, gestures and body movement and exploration objects, for example to enhance the learning capability of the platform that is used to observe activities and behavior of persons to provide accurate safety measurements during surveillance process.

Alternatively, any machine learning paradigm instead of neural networks can be used in the training and learning process.

Artificial Intelligence enables the platform of the present invention to be trained for the following:
Clumping of cells or organisms
Sperm cell health testing, e.g., motility or movement
Feeding behaviors
Sleep studies
Cognitive research
Drug studies, e.g., brain-behavior testing
Forgotten item detection (such as noticing when a person forgets their keys)
Casing behavior (such as entering a space, walking towards an object slowly, then exiting, then later returning and quickly approaching the object and picking it up)
Detecting the number of times a person enters and/or exits a space Detecting the number of times a person passes through a passage Detecting the distance a person traveling through a passage or in a defined space Detecting an interaction between a person and an object (known or unknown)

Detecting the movement of an individual relative to a group of other persons

Detecting the movements of multiple individuals relative to each other

Detecting the movements of multiple groups of persons relative to each other

Other behavioral studies as evidenced by changes in movement or interaction

And these capabilities enable the following key benefits:

Artificial Intelligence (AI) enables the platform to be highly flexible, capable of teaching itself to recognize a wide variety of organisms and behaviors, then automatically learn and improve from experience.

Cloud based architecture requires no software to be installed, enable analysis to be centralized or shared among authorized users.

User-configurable software settings on classifying behaviors, based on measured distance, time, or organism/object characteristics, provide features for a group of users to establish uniform procedures for health and quality testing.

No specialized hardware or cameras required; in other words, there is no need for RFID, photobeams, infrared cameras, or the like. Users can upload an MP4 or MOV file recorded on a basic smartphone or equivalent camera and the software will use AI to recognize organisms, objects, and behaviors.

Automation eliminates the need for highly skilled scientists to manually watch videos and consistently score movements or behaviors.

Predicting the future action of an individual based on detected individual and/or group behavior.

Predicting the future action of a group based on detected individual and/or group behavior.

During training of the platform 130, one training data set was developed from labeled images of at least one feature of the at least one person 160 and exploration object(s), derived from the videos that were manually reviewed and scored according to a Behavior Test Protocol, which was done for investigating human behavior.

The platform 130 comprises or is associated with a processor 135 and a memory 136. The memory 136 comprises stored instructions, which cause the platform 130 to perform functions on a video image(s) when executed by the processor 135. The processor 135 is configured to execute instructions stored in the memory 136 and to perform various processes based on several processor technologies known in the art. Examples of the processor 135 include, but not limited to, an X86-based processor, a Reduced Instruction Set Computing (RISC) processor, an Application-Specific Integrated Circuit (ASIC) processor, and a Complex Instruction Set Computing (CISC). The memory 136 includes suitable logic, circuitry, interfaces, and/or code that may be configured to store the set of instructions, which are executed by the processor 135. Preferably, the memory 136 is configured to store one or more programs, routines, or scripts that are executed in coordination with the processor 135. The memory 136 may be a Random Access Memory (RAM), a Read-Only Memory (ROM), a Hard Disk Drive (HDD), a storage server, and/or a Secure Digital (SD) card, for example.

The platform 130 further comprises a detection module 131, a measurement module 132, a behavior determination module 133 and a notification module 134.

The detection module 131 detects the at least one feature of the at least one person 160 with the at least one object 170 from the at least one video image after receiving it from the recording unit 110. The detection module 131 utilizes a knowledge graph to detect the at least one feature of the at least one person 160 and the at least one object 170. In an embodiment of the present invention, the at least one feature includes body part(s) of the at least one person 160 such as eye(s), hand(s), head, for example.

The detection module 131 is also configured to observe continuously, and tabulating criteria such as:

Observing number of people entering and exiting over, and during every specific time interval, Monitoring as an example: Amongst a group of five people standing around, disbursing, and then at least three of those people returning after thirty minutes. Further, one person turning their face towards a specific object (here the object 170), and repeats the same mannerism more than a designated number of times.

Detecting a number of attempts to pass through a passage (not shown, but readily understood by those of ordinary skill in the art upon reading this disclosure) and a distance travelled by the person 160 from the passage or out of the defined space 150.

The measurement module 132 then measures one or more parameters such as proximity between the at least one feature of the at least one person 160 and the at least one object 170, eye coordinates and head coordinates, for example.

The measurement module 132 measures the proximity by determining center-of-mass of the at least one feature associated with the at least one person 160 in the at least one video image, and by tracking movements of the at least one feature in relation with the at least one object 170 using the center-of-mass of the at least one feature. In this way, the tracked movement helps in measuring the proximity. The proximity may be associated with a predefined threshold criterion.

For example, once the proximity meets the pre-defined threshold criterion, such as the center-of-mass of the at least one feature being less than four centimeters from the center-of-mass of the at least one object 170 (defined here as an 'exploration object') for a duration of less than or equal to one second, the behavior determination module 133 automatically determines, defines and stores the behavior characteristics of the at least one person 160.

Similarly, the measurement module 132 may measure at least one of the eye coordinates and the head coordinates associated with the at least one person 160 by determining coordinates of at least one eye and the head derived from a currently detected position of an eye and the head associated with the person 160 in at least one video image, and then tracking movements of the eye and the head in relation with the object 170 relative to the current position of the eye and the head. Once the eye coordinates and head coordinates meet a pre-defined threshold coordinates criteria, the behavior determination module 133 automatically determines the behavior characteristics of the at least one person 160.

The behavior characteristics are determined in relation to the object 170. The behavior characteristics comprise at least one type of behavioral event of the person 160, a time interval corresponding to each type of behavioral events, a number of occurrences of each type of behavioral event(s), a latency associated with each type of behavioral event(s), and a distance traveled by the person 160. For example, the number of entries and exits of the person 160 in the defined space 150, the number of attempts to pass through a passage, a distance travelled by the person 160 from the passage (or out of the defined space 150), and the eyes and/or head movement during picking up the at least one object 170 may all be detected, tracked, and stored as measurements.

The time interval corresponding to each type of behavioral event is based on a time stamp assigned to an initial video frame and a final video frame of the at least one video image. The initial video frame indicates a start of the type of behavioral event and a final video frame indicates an end of the type of behavioral event, wherein the type of behavioral events comprises picking up the at least one object 170 and touching the at least one object 170. For example, the person 160 may pick up the object 170 and puts it in a shopping cart, which depicts an appropriate action, while by contrast if the person 160 puts the object 170 in a briefcase/coat/pocket, this event depicts an inappropriate action.

Inappropriate picking up is an event counted when proximity between the at least one feature and the at least one object 170 meets a first pre-defined threshold criterion associated with an inappropriate event, where the first pre-defined threshold criterion is associated with a first value. However, appropriate picking up or touching or passing by an object is an event counted when proximity between the feature and the object 170 meets a second pre-defined threshold criterion, where the second pre-defined threshold criterion is associated with a second value. In an embodiment of the present invention, the second value is greater than the first value.

The number of occurrences of each type of behavioral events is based on a measurement of each type of behavioral events for each video frame, and converting each video frame into a pre-defined time (or interval of time between frames).

After the behavior determination module 133 determines the behavior characteristics of the person 160 based on detecting a characteristic or an action such as the picking up, touching, passing by the object 170, and/or detecting eye and head coordinates while interacting with the at least one object 170, for example, a notification message indicating the behavior characteristics of the person 160 is provided by the notification module 134. For example, the notification module 134 indicates the behavior characteristics of the at least one person 160 and number of times he/she attempted to enter or exit the defined space 150 or the passage in the defined space 150. In yet another example, the notification module 134 indicates/alerts when the at least one person 160 enters the defined space 150 and walks towards the at least one object 170 slowly, then exits, then later returns and quickly approaches the at least one object 170, picks it up and exits.

The platform 130 also generates a graphical interface such as a heatmap comprising an activity level of the person 160 within each segment of the video frame. Preferably, the activity level indicates a time consumed by the person 160 in performing the behavior characteristic(s) within each segment of the video frame, and provides a notification indicating the graphical interface.

The platform 130 may be a software application that can be a web-based or cloud-based platform that can be accessed via the user equipment 120. Alternatively, the platform 130 may be a downloadable software application. The platform 130 is an artificial intelligence-based platform that advantageously enables automated monitoring of movement/behavior of the at least one person 160 in the defined space 150.

As stated earlier, the human behavior monitoring system 100 comprises the server 140. The server 140 may be physically an independent computing device or it may be cloud-based. The server 140 may be a remote server that receives and stores the processed information of the platform 130 which may be further utilized by the human behavior monitoring system 100 if required.

Although FIG. 1 has been explained with respect to a single person and a single object, the same can be implemented in case of single person-multiple objects, multiple persons-single object, multiple persons-multiple objects, and where a 'group' of people or objects may stand in for either or both the person 160 or object 170 without limiting the scope of the present invention.

Figure 2:
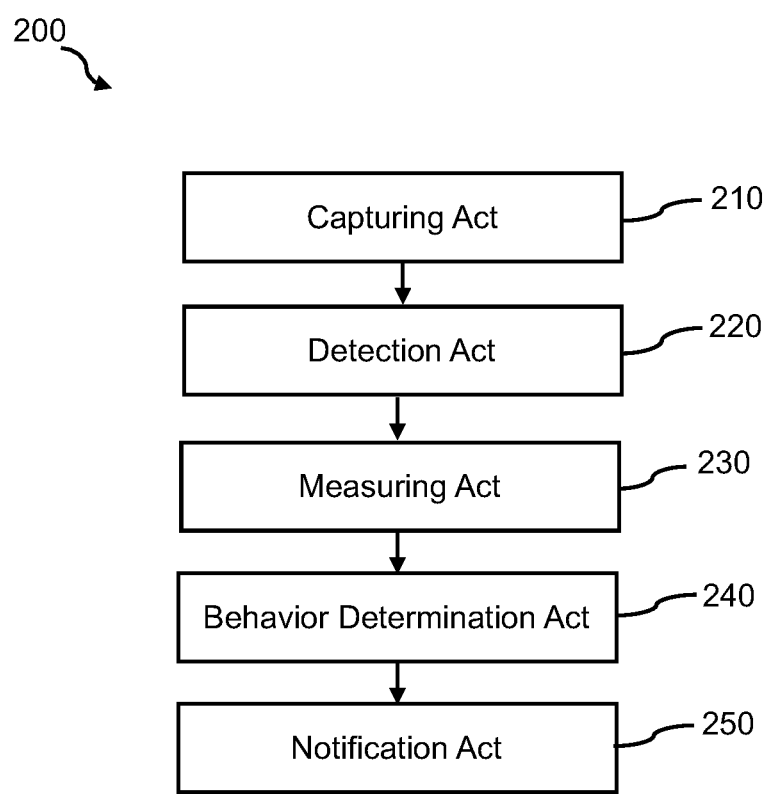
FIG. 2 is a flow diagram of a behavior identification algorithm.

FIG. 2 is a flow diagram of a behavior identification algorithm 200. It may be noted that in order to explain the behavior identification algorithm 200, references will be made to the elements described in FIG. 1 to better explain the functions of FIG. 2; however, the functions of the behavior identification algorithm 200 may stand on its own independent of the underlying physical hardware employed. Generally, the behavior identification algorithm 200 identifies the behavior characteristics of at least one person 160 in a defined space 150 interacting with at least one object 170 in the defined space 150.

The behavior identification algorithm 200 begins with a capturing act 210. In the capturing act 210 the recording unit 110 captures at least one video image of at least one person 160 and transmits the image to the platform 130. The recording unit 110 transfers the video image(s) of the person(s) 160 to the platform 130 via the user equipment 120 in real-time or in near real-time or in a recorded form.

In a detection act 220 the platform 130 detects at least one feature of the person(s) 160 with the at least one object 170 in the video image(s) after receiving it from the recording unit 110, wherein the platform 130 utilizes a knowledge graph to detect at least one feature each person(s) 160 and the object(s) 170. The feature(s) may include body part(s) of the person(s) 160 such as eye(s), hand(s), leg(s), foot/feet or head, for example.

Next, in a measuring act 230 the platform 130 measures the one or more parameters such as the proximity between the at least one feature of the at least one person 160 and the at least one object 170, such as the eye coordinates and the head coordinates, for example. Measurement of the one or more parameters is already explained in conjunction with FIG. 1.

Based on the measurement of the one or more parameters, the platform 130 automatically determines the behavior characteristics of the person(s) 160 in a behavior determination act 240. The behavior characteristics are determined in relation with the object(s) 170 as already discussed above in conjunction with FIG. 1.

In an example, determination of behavior characteristics may be based on a situation "fit" (in other words, determining a detected pattern that best fits a known or predicted pattern). A situation may be a normal situation, or an abnormal situation, for example, or other situations that may be non-binary.

For example, during an 'abnormal' situation the proximity between the at least one feature and the at least one object 170 meets a first pre-defined threshold criterion, where the first pre-defined threshold criterion is associated with the first value, whereas by contrast during a 'normal' situation, the proximity between the at least one feature and the at least one object 170 meets a second pre-defined threshold criterion, where the second pre-defined threshold criterion is associated with the second value. In an embodiment of the present invention, the second value is associate with a distance between a person and an object and is greater than the first value. For example, either the at least one person 160 takes the at least one object 170 from a place and keeps the at least one object 170 in the same or different place (normal situation), or the at least one person 160 takes the object 170 from a place and moves [a different distance] the object 170 into his pocket/briefcase and/or gives unexpected looks or stare (abnormal situation).

Similarly, during an abnormal situation, the eye coordinates and head coordinates exceed the pre-defined threshold coordinates.

In another use case, determination of behavior characteristics may be based on number of attempts of the person 160 to walk towards or walk away from the object 170. In yet another use case, determination of behavior characteristics may be based on picking up or touching the object 170 by the person 160 as described above.

Accordingly, in a notification act 250, an alert or notification message is generated depicting the behavior characteristics of the person(s) 160.

Although, FIG. 2 has been explained with respect to a single person and a single object, however, the same can be implemented in case of single person-multiple objects, multiple persons-single object, multiple persons-multiple objects, and where a 'group' of people or objects may stand in for either or both the person 160 or object 170 without limiting the scope of the present invention.

Figure 3:
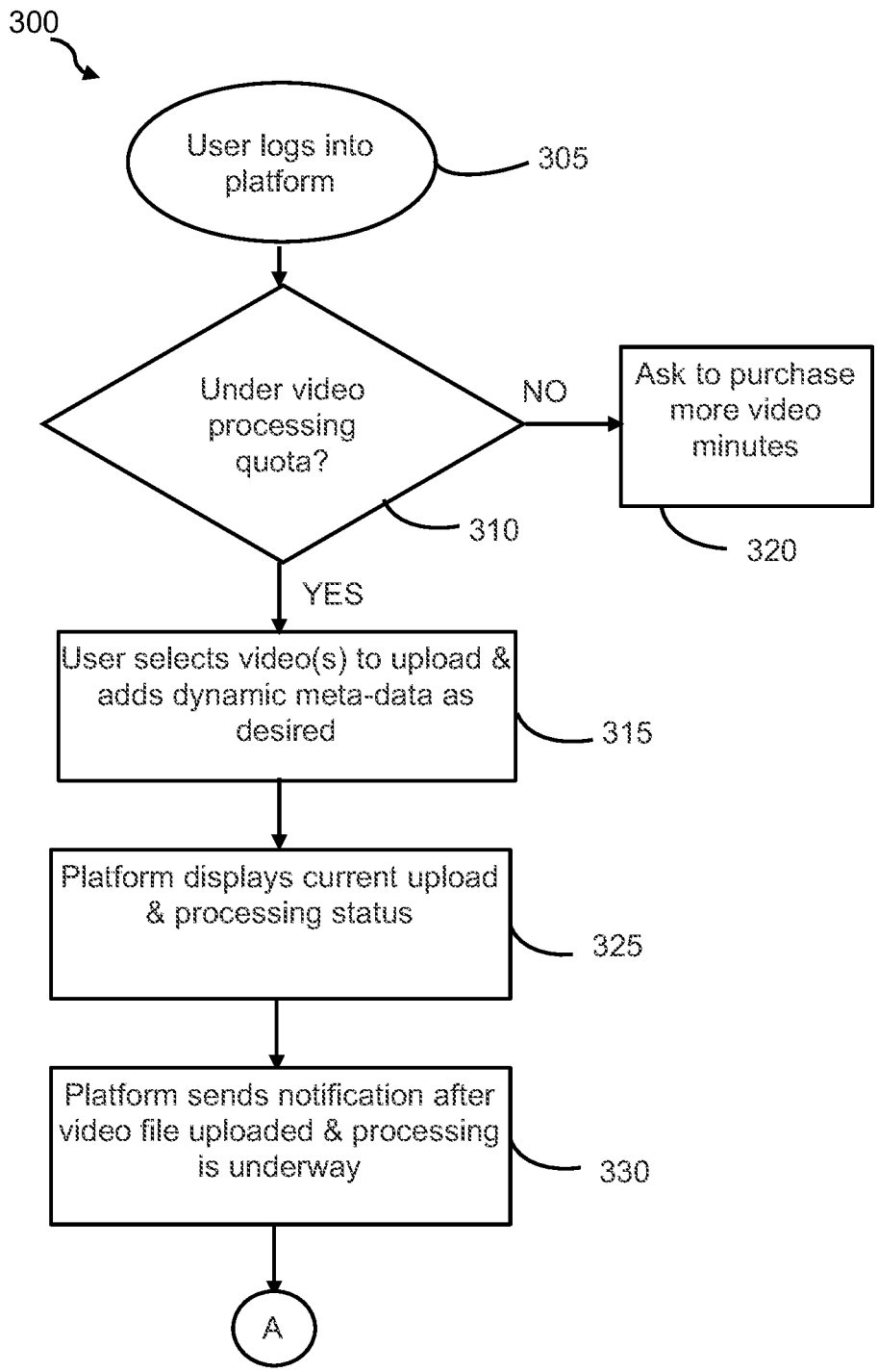
FIG. 3 illustrates a flow diagram to automate the human behavior monitoring system.

FIG. 3 illustrates a flow diagram to automate the human behavior monitoring system 100. The automation of the human behavior monitoring system 100 can be categorized in a plurality of phases, such as an upload phase, a process phase, and a result phase, for example. The upload phase allows a user to upload the at least one video image of the at least one person 160 under certain circumstances, such as a free video minute/second allowance. Once the user has received the at least one video image of the at least one person 160 via the recording unit 110, the at least one video image can be analyzed further in order to determine the behavior of the at least one person 160, wherein the at least one video image can be a recorded video, a real-time video, or a near real-time video, for example.

The user logs into the platform 130 at act 305, wherein the platform can be hosted on cloud server or other suitable web-based server. Alternatively, the platform 130 may work in an offline mode. Once the user has been entered in the platform 130, he can upload the at least one video image after confirmation on a video processing quota at act 310. If the user has a free video minute allowance, he can select the at least one video image to upload at act 315; else the user can purchase more video minutes at act 320. In other words, if the platform has exceeded a quota of processing time, a user is prompted to purchase more processing time at act 320 and the algorithm returns to the user login act 305 following either the purchase or a decline to the purchase.

The user can also add dynamic meta-data to the at least one video image as desired at act 315. Metadata is information about a data that provides information about other data such as uploaded data. Various types of metadata exist that can be used in the present invention such as descriptive metadata, structural metadata, reference metadata, statistical metadata and administrative metadata, for example.

Once meta-data tagging has been done, the platform 130 displays the status of current upload of the at least one video image and processing status at act 325 and after completion of the upload, the platform 130 sends notification about underway processing and stored video image(s) at act 330. The underway processing and the at least one video image are stored in a storage such as, but not limited to, S3 bucket. This notification is sent to the process phase where the uploaded video image(s) is ingested from the storage at act 335. Ingestion is the process of obtaining and importing data for immediate use or storage in a database. Here, the data is/are the at least one video image that can be streamed in real time or ingested in batches. Based on the ingested data, the platform 130 may perform functions such as: count behavioral events at act 340, generate heatmap(s) at act 345, and annotate the at least one video image at act 350, for example.

The total number of behavioral events or other activity level generates a graphical interface image(s) or heatmap(s) at act 345. The activity level indicates a time consumed by the at least one person 160 in performing the behavior characteristics within each segment of a video frame of the at least one video image. In other words, upon ingesting the at least one video image, the platform 130 preferably produces the annotated output video file that includes captions for the at least one person 160 and object recognition, behavior scoring, plus an EXCEL report for behaviors and time stamps, along with a PNG file export that presents the heatmap of human activity. In an embodiment of the present invention, the report can also be generated in other formats such as MATLAB file, for example.

The annotate video(s) act 350 includes a metadatum related to the behavioral characteristics of the at least one person 160. Once the annotation has been done by the platform 130, the user receives a notification that the at least one video image has been processed at act 355 and a corresponding EXCEL result(s) is uploaded to the platform 130 at act 360. Simultaneously, the user is notified, at act 365, that the EXCEL results are available for review. Further, the heatmap of the activity level is uploaded to the platform 130 at act 370 and the user is notified with the heatmap result(s) at act 375. Furthermore, the annotated video is uploaded to the platform 130 at act 380 and the user is notified of the annotated video at act 385. Accordingly, results are generated.

The present invention has the capability to handle video image processing for both MP4 files and .MOV files as well as other video formats. Object detection code operates as a fully convolutional neural network with whole image identification within a bounding box, allowing the platform to see the context surrounding an image and reduce errors for what the software sees as similar background objects. The output video file displays the probability determination for the recognized objects. For example, the platform believes that the object it recognizes is, within 99.15% probability, a known object.

Advantageously, the present invention eliminates the need for human based, manual scoring techniques. Automation enables an extensive number of behavior tests to be scored, reported and analyzed through a centralized database on a cloud-computing platform and generates data not feasible for humans to produce.

Benefits

The present invention removes the subjectivity associated with a person simultaneously observing, estimating distances, and interpreting behavior. The present invention calculates distance between the center-of-mass of designated regions, such as the distance between the centers of mass of the head of a person and object(s). Each distance calculation is timestamped for each frame of video for which the measurement is performed. Thereafter, the present invention applies the user-configurable rules for classifying behavior.

As a result, the present invention generated classifications of exploration behaviors are more consistent that human interpretation of behavioral activities, with the software employing AI to recognize and perform consistent tracking of a defined region of a body and objects without human intervention in order to generate uniform data that enables users to carry out a defined protocol for modeling behaviors. The present invention provides user-configurable controls (e.g., knobs and dials) that enable users to uniformly adjust the interpretation of behavior data based on research goals, without impacting the integrity of the AI collected data.

Further, with the capability to "time-slice" data or consider displacement as a vector (vs. a scalar) and model its rate of change over time (derivative), the present invention can take advantage of the inventive software. First, it can establish a statistically significant sample of set of what is "normal" behavior, which is much more feasible with AI automation that requires no human labor other than uploading files. Secondly, it can track direction and velocity to establish a "new" behavioral model for symptoms.

Unless otherwise defined, all technical and scientific terms used herein have the same meaning as commonly understood by one of ordinary skill in the art to which this invention belongs. Although methods and materials similar to or equivalent to those described herein can be used in the practice or testing of equivalent systems and methods, suitable systems and methods and are described above.

Although the invention has been described and illustrated with specific illustrative embodiments, it is not intended that the invention be limited to those illustrative embodiments. Those skilled in the art will recognize that variations and modifications can be made without departing from the spirit of the invention. Therefore, it is intended to include within the invention, all such variations and departures that fall within the scope of the appended claims and equivalents thereof.

What is claimed is:

1. A method for automatically determining behavior characteristics of at least one person in a defined space, the method comprising:
   detecting, by a detection module comprising a processor executing a neural network trained with labeled images of human features and objects, at least one feature of the at least one person and at least one object from at least one video image using a knowledge graph representing relationships between the at least one feature and the at least one object to identify the at least one feature and the at least one object;
   measuring, by a measurement module comprising the processor, first parameters corresponding to a proximity between the at least one feature of the at least one person and the at least one object by determining a center-of-mass of the at least one feature and tracking movements relative to the at least one object;
   automatically determining at least a first behavior characteristics, by a behavior determination module comprising the processor, of the at least one person by determining if the proximity meets a predefined threshold criteria, wherein the behavior characteristics comprise at least one of:
   a type of behavioral events of the at least one person, a time interval corresponding to each type of behavioral events, a number of occurrences of each type of behavioral events, a latency associated with each type of behavioral events, or a distance traveled by the at least one person; and providing a notification message, by a notification module comprising the processor, indicating the first behavior characteristics of the at least one person via a user equipment interface.

2. The method of claim 1 wherein, the act of detecting further comprises: obtaining the at least one video image comprising the at least one person and the at least one object; and detecting the at least one feature of the at least one person and the at least one object using the knowledge graph to map relationships between detected features and objects.

3. The method of claim 1 wherein, the measuring act further comprises: determining a center-of-mass of the at least one feature associated with the at least one person in the at least one video image; tracking movements of the at least one feature in relation with the at least one object using the center-of-mass of the at least one feature; and measuring the proximity between the at least one feature and the at least one object based on the tracked movements to determine if the proximity meets the predefined threshold criteria.

4. The method of claim 1 wherein the measuring act further comprises: measuring at least one eye coordinate: determining coordinates of at least one of a pair of eyes to define a first eye coordinate derived from a current position of the at least one of the pair of eyes associated with the at least one person in the at least one video image; tracking movements of the at least one of the pair of eyes in relation with the at least one object using the current position of the at least one of the pair of eyes; and measuring the at least one of the eye coordinates based on the tracked movements to determine if the eye coordinates meet a predefined eye coordinate threshold criterion associated with the behavior characteristics.

5. The method of claim 1 wherein the time interval corresponding to each type of behavioral event is based on a time stamp assigned to an initial video frame and a final video frame, wherein the initial video frame indicates a start of the type of behavioral event and the final video frame indicates an end of the type of behavioral event.

6. The method of claim 1 wherein the number of occurrences of each type of behavioral events is based on a measurement of each type of behavioral events for each video frame, and converting each video frame into a predefined time interval.

7. The method of claim 1 wherein the type of behavioral events comprises: touching the at least one object, passing by the at least one object, appropriately picking up the at least one object, or inappropriately picking up the at least one object.

8. The method of claim 7 wherein the inappropriate picking up is an event counted when proximity between the at least one feature and the at least one object meets a first pre-defined threshold criterion, wherein the first pre-defined threshold criterion is associated with a first value.

9. The method of claim 7 wherein the appropriate picking up, touching, and passing by are an event counted when proximity between the at least one feature and the at least one object meets a second pre-defined threshold criterion, wherein the second pre-defined threshold criterion is associated with a second value.

10. The method of claim 9 wherein the second value is greater than the first value.

11. A system for automatically determining behavior characteristics of at least one person in a defined space, the system comprising: at least one processor; and a memory having stored instructions, the instructions causing the system to perform functions when executed by the at least one processor, the functions comprising: detecting, by a detection module comprising the at least one processor executing a neural network trained with labeled images of human features and objects, at least one feature of the at least one person and at least one object from at least one video image using a knowledge graph representing relationships between the at least one feature and the at least one object to identify the at least one feature and the at least one object; measuring, by a measurement module comprising the at least one processor, first parameters corresponding to a proximity between the at least one feature of the at least one person and the at least one object by determining a center-of-mass of the at least one feature and tracking movements relative to the at least one object; automatically determining at least a first behavior characteristics, by a behavior determination module comprising the at least one processor, of the at least one person by determining if the proximity meets a predefined threshold criteria, wherein the behavior characteristics comprise at least one of: a type of behavioral events of the at least one person, a time interval corresponding to each type of behavioral events, a number of occurrences of each type of behavioral events, a latency associated with each type of behavioral events, or a distance traveled by the at least one person; and providing a notification message, by a notification module comprising the at least one processor, indicating the first behavior characteristics of the at least one person via a user equipment interface.

\* \* \* \* \*